United States Patent [19]

Harris, Jr.

[11] Patent Number: 4,787,658
[45] Date of Patent: Nov. 29, 1988

[54] UNIBODY BUMPER SYSTEM

[76] Inventor: John Harris, Jr., 14051 Lauerman St., Cedar Lake, Ind. 46303

[21] Appl. No.: 891,234

[22] Filed: Jul. 29, 1986

[51] Int. Cl.$^4$ .............................................. B60R 19/20
[52] U.S. Cl. .................................... 293/107; 293/102; 293/121
[58] Field of Search ............... 293/102, 120, 121, 122, 293/126, 154, 155, 109, 1, 107, 108, 110; 138/89, 93

[56] References Cited

U.S. PATENT DOCUMENTS

| | | | |
|---|---|---|---|
| 1,464,594 | 8/1923 | Beale | 293/107 |
| 1,504,581 | 8/1924 | Schmidt | 293/107 |
| 1,561,184 | 11/1925 | Offenhauser | 293/110 |
| 1,679,782 | 8/1928 | Postel | 293/107 |
| 1,780,908 | 11/1930 | Clausen | 293/107 |
| 2,089,500 | 8/1937 | Ochadloski | 293/107 |
| 2,202,460 | 5/1940 | Maciel | 293/107 |
| 2,236,507 | 4/1941 | Kreitz | 293/107 |
| 3,084,961 | 4/1963 | Merriman | 138/89 X |
| 3,195,818 | 7/1965 | Herberg | 138/89 X |
| 3,829,141 | 8/1974 | Igwe | 293/107 |
| 3,961,818 | 6/1976 | Roth, Jr. | 293/107 |
| 4,061,385 | 12/1977 | Schwartzberg | 24/342 |
| 4,431,221 | 2/1984 | Jahnle | 293/132 X |

Primary Examiner—Johnny D. Cherry
Assistant Examiner—Russell D. Stormer
Attorney, Agent, or Firm—Richard G. Kinney

[57] ABSTRACT

An improved unibody bumper system including a concave back plate welded to the sheet metal of the unibody, to be integral therewith across the front and back of the automobile unibody and wrapped around on the sides. A pressurized, elongated bumper is secured to the back plate by fasteners at either of its sealed ends. The bumper member is formed by taking a length of hose or other flexible tube sized and shaped to conform to the concave back plate and sealing the ends by clamping the walls inward. A mastic-covered flat seal member is provided in the tube at the area of clamping. In a first embodiment, a C-shaped clamp member is bolted against the hose or tube end by a bolt which passes through a hole formed therein, which bolt also serves to secure the end of the bumper element to the backing plate. In a second embodiment, a short section of a close-fitting metal sleeve is placed over the tube and then pressed flat, the sleeve serving to thereafter clamp the walls of the tube end together. The bumper element is provided with an air valve and stem which projects within the automobile body so as to be accessible only from the protected areas of the finished automobile (the trunk or under the hood). The bumper elsewhere is assembled and secured at its ends without being inflated and thereafter held in place by being inflated.

3 Claims, 2 Drawing Sheets

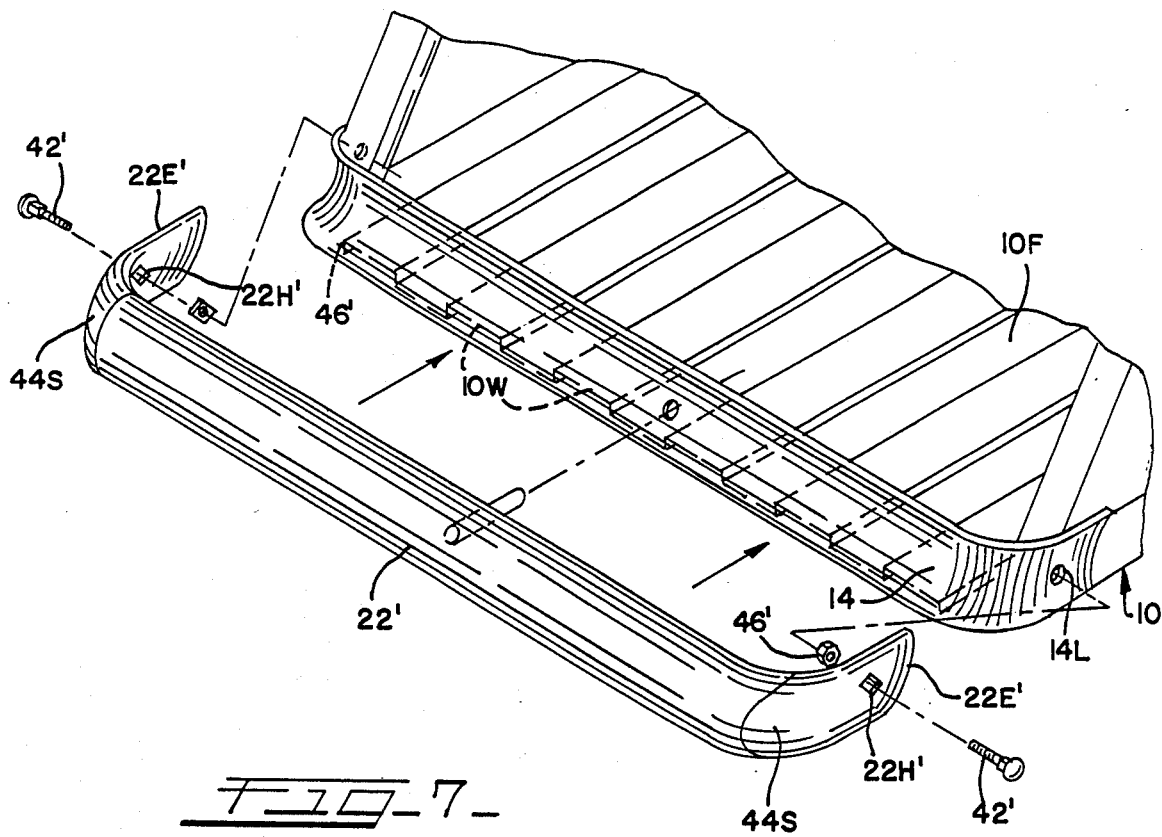
FIG_6_
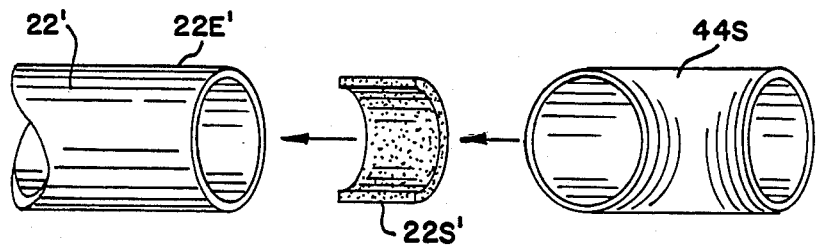
FIG_7_
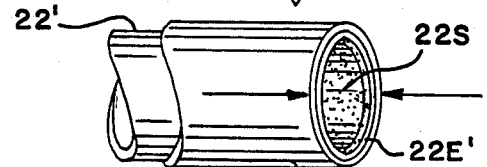
FIG_8_
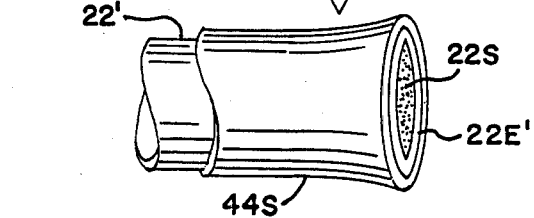
FIG_9_

4,787,658

UNIBODY BUMPER SYSTEM

FIELD OF THE INVENTION

The present invention is directed to improvements in bumper systems for unibody automobiles and to improved methods of constructing and installing pressurized bumper elements in such automobiles.

BACKGROUND OF THE INVENTION

Unibody construction has become standard for most U.S. non-commercial road automobiles, especially those of the compact and smaller sizes. Such unibody construction employs shorter side rails for a frame which is largely made up of formed steel sheet metal stampings welded together.

Automobile bumper systems in present commercial use employ a bumper member, normally a steel stamping, mounted to a pair of spaced-apart rods which form part of a shock absorber mounting. These bumpers are designed to take a straight-on hit and to absorb a good part of the energy in shock-absorbing members. Unfortunately, they do not perform as well when oblique hits occur.

The primary support for this type of member is the shock absorber structures which project inwardly from the bumper and are secured at their bases to the body of the automobile. These are essentially horizontal cantilever supports projecting to form with the bumper a unbraced "box" or rectangular structure.

Thus, oblique forces acting on the bumper tend to bend the shock-absorbing members sideways and shift the bumper sideways into the unibody and the "skin" sheet metal. Even a relatively minor hit can thus result in a major repair job and major repair bill to the owner.

Also in certain accidents, e.g., those involving a large-tired vehicle and a conventional automobile, the cantilevered bumper system serves as a stairstep or ramp over which the large wheels can travel and thus reach the passenger compartment easier and quicker.

Such commercial bumper systems are also expensive to install requiring a number of separate, labor-intensive steps to mount the shock-absorbing structures to the body and attach the bumper unit to them.

Pressurized bumpers have been produced for many years on conventional automobiles (see, for example, U.S. Pat. Nos. 2,089,500; 2,202,460; 2,236,507; 3,829,141; 4,061,385) and have and have been proposed to be used with the dual shock-absorbing system (U.S. Pat. No. 3,961,818), but they have not met with widespread commercial acceptance and do not overcome the aforementioned problems.

SUMMARY OF THE PRESENT INVENTION

To overcome one or more of the drawbacks of prior such systems, an improved automobile bumper system constructed in accordance with the present invention combines into a unibody automobile body an elongated generally concave bumper back plate which is welded or otherwise integrated into the sheet metal of the unibody. The back plate spans across the front or back of the unibody. An elongated bumper member is also provided of a closed resilient material, generally tubular in shape, and hermetically enclosing a volume of gas under pressure. The bumper member extends along and outside the back plate and is secured to it and conforms to it.

This construction provides a bumper which absorbs small hits or forces from any angle without any resulting sheet metal damage since it eliminates the cantilevered structural support.

Further, the bumper system may be more easily and inexpensively installed, since the back plates may be assembled and welded in place as part of the semiautomated unibody assembly procedures, and the bumper member may be thereafter easily mounted (and replaced) with a minimum of steps.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 6 is a perspective exploded partial view of the rear of a unibody automobile with a scond embodiment of a bumper member, illustrating the method of assembly, all in accordance with the present invention.

FIGS. 7 through 9 are fragmentary views of successive steps in forming one end of the bumper of FIG. 6.

DETAILED DESCRIPTION OF TWO PREFERRED EMBODIMENTS

Figure 1:
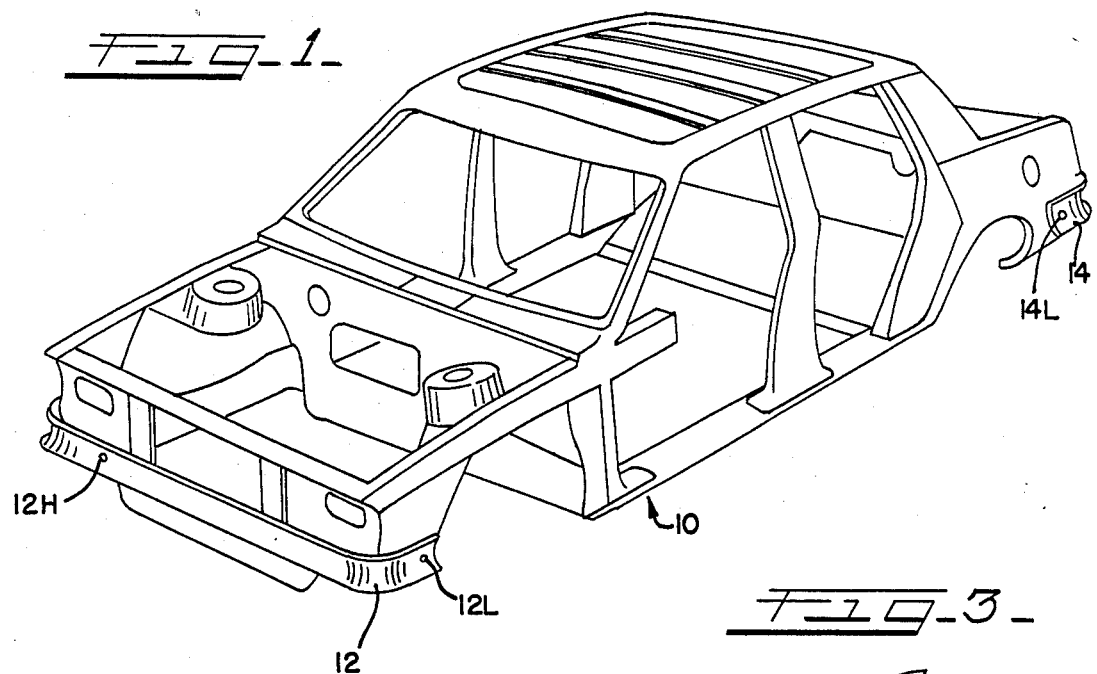
FIG. 1 is a perspective view of a unibody for an automobile made to incorporate the bumper system of the present invention.

Referring to FIG. 1, there is depicted a unibody of an automobile which is generally designated by the number 10. In accordance with the present invention, a front bumper back plate 12 and rear back plate 14 are incorporated into the unibody. These back plates 12, 14 are generally elongated, concave (in cross section) and span across the front and back of the unibody 10. They are integrated into the unibody by being welded to the other sheet metal unibody parts.

The back plates 12, 14 may be formed of, for example, a one-eighth inch thick spring steel spot-welded top and bottom and at other points of contact to the unibody sheet metal.

Figure 2:
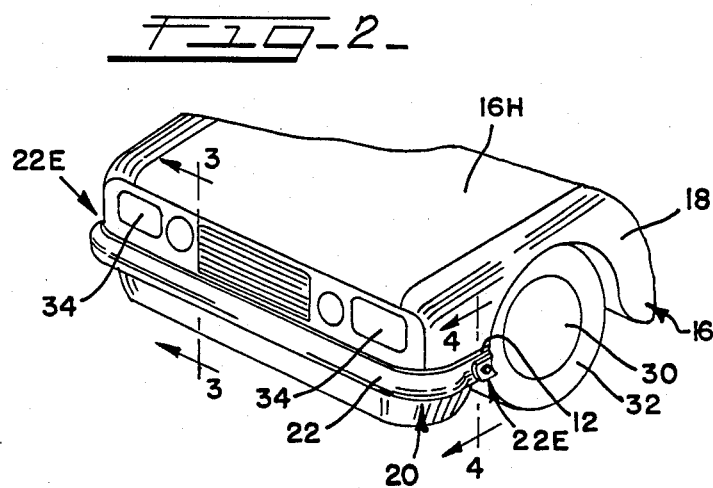
FIG. 2 is a perspective fragmentary view of an automobile incorporating a bumper system constructed in accordance with the principles of the present invention.

In FIG. 2, there is depicted an automobile 16 which employs a bumper system 20 constructed in accordance with the present invention. This automobile 20 employs the unibody 10 and back plate 12 of the prior figure. A thin sheet metal "skin" 18 and other standard equipment such as wheels 30 with tires 32 and lights 34 have, of course, been added. Also added is an elongated bumper member 22 constructed in accordance with the present invention.

Figure 3:
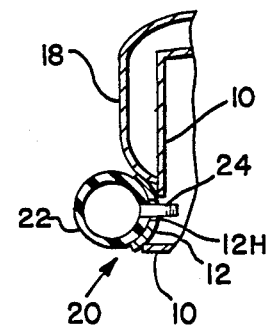
FIG. 3 is a sectional view of a portion of the automobile of FIG. 2 as seen from the plane defined by the line 3—3 in that figure when looking in the direction of the associated arrows.

As shown in FIG. 3, the bumper member 22 is formed of resilient flexible tubing and is pressurized through an air valve and stem 24. This stem 24 in accordance with one feature of the invention projects through a hole 12H (FIG. 1) through the back plate 12 to the protected interior 16I of the automobile 16. This is in the area protected by the hood 16H. In the case of the rear bumper received in the back plate 14, its stem extends into the locked trunk compartment.

The bumper member 22 may be of many different shapes to meet the desires of the automobile designer. Thus, it could have a varying cross-sectional shape from being more or less square to oval and changing from area to area along its length at the desire of the designer. However, the most efficient shape for economy and effectiveness is that shown—a circular cross section.

The circular shape also allows the use of standard tubular hosing for the bumper member 22. High pressure (e.g., 225 psi) bias cord reinforced rubber hose of e.g. a four to six-inch diameter may be employed. (One brand of such hose employed in a prototype was "Boston Performer II".)

Figure 5:
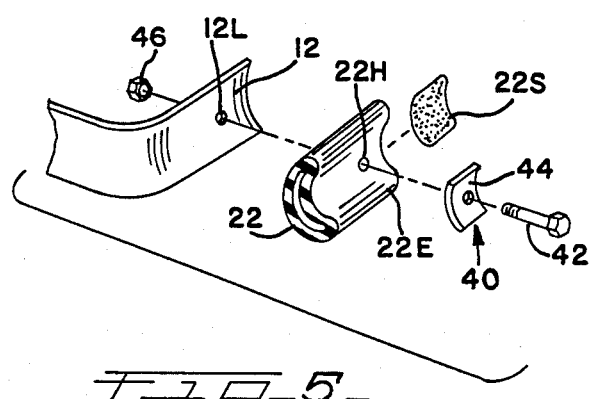
FIG. 5 is an exploded partial view of parts of the automobile of FIGS. 2-4, one method of assembly and sealing the ends of the bumper.
Figure 4:
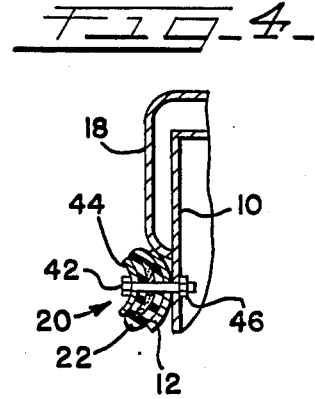
FIG. 4 is a sectional view of another portion of the automobile of FIGS. 2-3 as seen from the plane defined by the line 4—4 in FIG. 2 when looking in the direction of the arrows associated with that line.

The tubular member 22 is closed and hermetically sealed at its ends 22E. In accordance with a feature of the invention, this may be done as shown in FIGS. 4 & 5. Referring to those figures, the seal is preferably formed by inserting a mastic-coated seal 22S in the flattened end 22E of the hose or tube 22. Metal clamping means 40 including a bolt 42, a curved clamp plate 44, and nut 46, are employed. A hole 20H is preferably first drilled through both sides of the tube 22 and also through the seal 22S. This should be done after assembly of the plate 40 to the collapsed tubular member 22 when it is aligned with a hole 12L in the back plate 12 (or else that hole may be formed at the same time as it is, by drilling through the member 22 and the back plate 12 in one operation).

Other fasteners may be employed besides the bolt 42 and nut 46. Self-tapping screws, for example, may be employed (which screws also may drill the hole 22H). The hole 12L may be threaded or the nut 46 welded to the inside surface of the plate 12, to aid in assembly.

Note should be taken of the fact that the bumper member 22 is secured to the back plate 12 at only two places, its ends 22E. After being so secured (and in the same process having the ends 22E closed and sealed), with the member 22 positioned in the concave back plate 12, pressurized gas is impressed through the valve and stem 24 (which preferably is of the same type as used in the tires 32). This causes the tubular bumper member to become more rigid and round and seats it firmly into the concave back plate 12.

Note that this is a simple operation: attach one end and then the other and inflate.

SECOND EMBODIMENT

Referring now to FIG. 6, the rear of the unibody 10 is there depicted. The rear back plate 14 is preferably welded directly to the floor pan 10F, as along a line 10W. In this figure, a second embodiment for the inventive bumper member is depicted and designated 22'.

This embodiment differs from the prior bumper 22 by the clamping means for closing and sealing the ends 22'E. This means in this embodiment is a metal sleeve 44S (which may be chrome-plated). This end seal may be formed as shown in FIGS. 7-9 by first slipping the sleeve 44S over the end 22E with a mastic-coated seal element 22S' inserted in the opening of the tube 22'. Then, subject the metal sleeve 44 to forces (FIG. 8) so as to flatten it (FIG. 9), so that it thereafter clamps the end 22E closed.

A hole 22H' (FIG. 6) may be made in the combination and it assembled using a fastener, in this case a carriage bolt 42' and nut 46'.

While two particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

I claim:

1. In an automobile body of the unibody type having primary framing provided by formed sheet metal:

a generally concave elongated bumper back plate welded to or otherwise integrated along its length into the unibody sheet metal, to form a vertically continuous part thereof, and said back plate not being mounted extended therefrom nor so as to move independently therefrom, said back member extending across the outside of at least one of the front or back of the unibody;

an elongated bumper member formed of closed resilient sheeting material of a generally tubal shape, hermetically enclosing a volume of gas under pressure, said bumper member extending along and outside said back plate and being sealed at its ends, said member being secured to and conforming to said back plate;

wherein said bumper member is sealed at its ends by having its sides collapsed one toward the other and held together by metal clamping means; and said metal clamping means is a metal tube section which surrounds the end of the bumper member and is flattened at the sealed end.

2. The combination of claim 1 wherein a sealing material is provided within said bumper member between its collapsed sides and said fastener penetrates through holes formed in said clamp member, said bumper member, said seal material and said back plate.

3. The method of securing a pressurized elongated bumper member of a generally tubular shape to an automobile having an elongated back plate which is concave to receive the bumper member comprising the steps of securing essentially only the ends of the unpressurized bumper member to the ends of the back plate and thereafter pressurizing the bumper member while placed in the back plate, thereby increasing the rigidity of the pressurized bumper member and causing it to be thereby firmly seated in and held by said concave back plate.

* * * * *